(12) United States Patent
Tanioka (10) Patent No.: US 7,207,769 B2
(45) Date of Patent: Apr. 24, 2007

(54) GAS TURBINE

(75) Inventor: Tadateru Tanioka, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/298,498

(22) Filed: Dec. 12, 2005

(65) Prior Publication Data

US 2006/0140754 A1    Jun. 29, 2006

(30) Foreign Application Priority Data

Dec. 27, 2004   (JP)   ............................. 2004-375536

(51) Int. Cl.
*F01D 25/01* (2006.01)
*F01B 25/26* (2006.01)

(52) U.S. Cl. ..................... 415/118; 415/14; 415/115

(58) Field of Classification Search ............. 415/115, 415/118, 175, 14, 173.1; 60/806
See application file for complete search history.

(56) References Cited

U.S. PATENT DOCUMENTS 4,632,635 A * 12/1986 Thoman et al. ............ 415/14
5,818,242 A * 10/1998 Grzybowski et al. ....... 324/642
6,772,581 B2    8/2004 Ojiro et al.
7,013,718 B2 *  3/2006 Ingistov et al. ............ 73/116

FOREIGN PATENT DOCUMENTS

JP        2001-248406        9/2001

* cited by examiner

*Primary Examiner*—Edward K. Look
*Assistant Examiner*—Dwayne J White
(74) *Attorney, Agent, or Firm*—Westerman, Hattori, Daniels & Adrian, LLP.

(57) ABSTRACT

Such a gas turbine is provided as can put into practical use a control technology which detects clearance between the tip of rotating blade and the inner circumference surface of ring segment surrounding them and adjusts the temperature, the pressure and the flow volume of the cooling fluid for blade rings/ring segments and the cooling fluid for rotors based on the output. A sensor is provided to detect the clearance between the tip of the rotating blade and the inner circumference surface of the ring segment. A sensor is integrated together with a first guide pipe by having a posterior portion thereof screwed together to a secondary pipe being installed to an edge of the first guide pipe inside of which a cooling fluid is introduced into. The first guide pipe is pressed to the blade ring from the outside of the casing so as to retain. The sensor and the first guide pipe being integrated together by being screwed together will not be separated although they are subject to vibrations during operation of a gas turbine and can be pulled out and inserted from the outside of the casing in replacement.

10 Claims, 9 Drawing Sheets

Prior Art

FIG. 11
Prior Art

GAS TURBINE

The present invention is based on the Japanese Patent Application No. 2004-375536 applied on Dec. 27, 2004.

BACKGROUND OF THE INVENTION

1. Field of the Invention

The present invention relates to a gas turbine, and especially, relates to a gas turbine which is expected to put such control technology into practical use as controls the temperature, pressure and flow volume of a cooling fluid for blade rings and segment rings in order to cool stationary vanes and rotating blades and of a cooling fluid for a rotor.

2. Description of the Prior Art

Generally, a gas turbine mainly consists of three elements including an air compression part ("compressor" hereinafter), a combustion part ("combustor" hereinafter) and a turbine part; wherein a combustor is installed between the compressor and the turbine part that are directly connected to each other by a main shaft. Here, FIG. 8 shows a longitudinal cross-sectional view of a turbine part of a general gas turbine.

Figure 8:
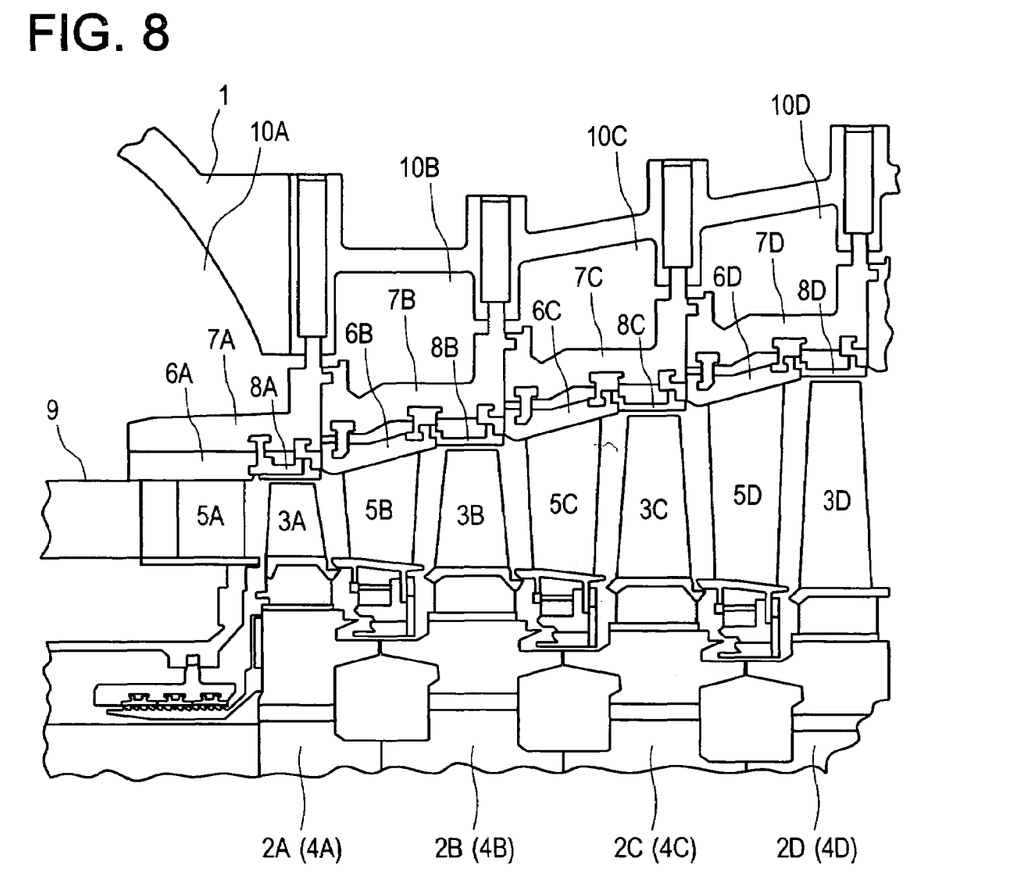
FIG. 8 is a longitudinal cross-sectional view showing the turbine part of a general gas turbine.

As shown in FIG. 8, a turbine part has a main shaft installed inside a casing 1 constructing an outer shape thereof so as to be able to rotate; wherein, the main shaft has the rotor discs 2A, 2B, 2C and 2D provided axially thereto in a plurality number of stages, for example, in four stages; and a plurality of rotating blades 3A, 3B, 3C and 3D extend in a radial pattern from the outer circumference of each of the rotor discs 2A, 2B, 2C and 2D. The rotor discs 2A, 2B, 2C and 2D and the rotating blades 3A, 3B, 3C and 3D comprise each of the rotating blade rotors 4A, 4B, 4C and 4D, rotating together with the main shaft in an integrated manner.

Additionally, inside the casing 1, the stationary vanes 5A, 5B, 5C and 5D are installed in a manner that they are arranged, alternating with the rotating blades 3A, 3B, 3C and 3D in each stage along the main shaft. The stationary vanes 5A, 5B, 5C and 5D in each stage are installed to the shrouds 6A, 6B, 6C and 6D on the side of the outer circumference, surrounding each of the stationary vanes 5A, 5B, 5C and 5D in each stage concentrically against the main shaft.

In addition, inside the casing 1, the blade rings 7A, 7B, 7C and 7D are coupled, surrounding each of the stationary vanes 5A, 5B, 5C and 5D and the rotating blades 3A, 3B, 3C and 3D in each stage concentrically against the main shaft. Inside the blade rings 7A, 7B, 7C and 7D in each stage, is coupled respectively each of the outer-circumference-side shrouds 6A, 6B, 6C and 6D, having the stationary vanes 5A, 5B, 5C and 5D installed thereto; and at the same time, ring segments 8A, 8B, 8C and 8D are coupled, surrounding each of the rotating blades 3A, 3B, 3C and 3D respectively in a concentric manner against the main shaft.

In a turbine part of a gas turbine as described hereinabove, high temperature and high pressure combustion gas is fed from a transition piece of a combustor through a gas path 9, serving as a working fluid; wherein by having the combustion gas flow to the stationary vanes 5A, 5B, 5C and 5D and the rotating blades 3A, 3B, 3C and 3D in each stage alternatively in sequence from the first stage through the fourth stage, the main shaft is rotary driven with the rotating blades 3A, 3B, 3C and 3D, namely the rotating blade rotors 4A, 4B, 4C and 4D. Then, when a generator is connected to a front edge of the main shaft, turning force of the main shaft is utilized as a source of electric power generation. On the contrary, when an injection port is installed to an end of the turbine part for exhaust of combustion gas, turning force of the main shaft is utilized as a jet engine.

In addition, in a compressor of a gas turbine, a rotating blade rotor rotates by rotation of the main shaft in the same manner as the turbine part, thereby inhaling the air in from the outside to be served as a working fluid; and the air is transported to a combustor, being compressed, going through the rotating blades and the stationary vanes alternatively. Compression air being introduced to the combustor burns herein together with a fuel being supplied, resulting in high temperature and high pressure combustion gas, which will be sent to the aforementioned turbine part.

Meanwhile, because high temperature combustion gas flows in the turbine part of a gas turbine, serving as a working fluid, cooling construction is indispensable in order to prevent excessive increase in temperature of the stationary vanes 5A, 5B, 5C and 5D and the rotating blades 3A, 3B, 3C and 3D. Generally, in order to cool the stationary vanes 5A, 5B, 5C and 5D, cooling fluid such as high pressure air and/or steam is introduced to each of the spaces 10A, 10B, 10C and 10D that are formed by the blade rings 7A, 7B, 7C and 7D in each stage and the casing 1, thereby cooling the blade rings 7A, 7B, 7C and 7D and the shrouds 6A, 6B, 6C and 6D on the outer circumference side, through which the cooling fluid for the blade rings is introduced to the stationary vanes 5A, 5B, 5C and 5D so as to cool them. The cooling fluid for the blade rings is also used for cooling the ring segments 8A, 8B, 8C and 8D, which will be referred as "cooling fluid for blade rings/ring segments" hereinafter. On the other hand, in order to cool the rotating blades 3A, 3B, 3C and 3D, cooling fluid such as high pressure air and/or steam is introduced into the inside of the rotor discs 2A, 2B, 2C and 2D in each stage, thereby cooling the rotor discs 2A, 2B, 2C and 2D, which makes the cooling fluid for rotors introduced to the rotating blades 3A, 3B, 3C and 3D to cool them.

Moreover, in recent years, as for the above-mentioned cooling fluid for blade rings/ring segments and the cooling fluid for rotors, it is examined to put a technology controlling the temperature, the pressure and the flow volume thereof into practical use in accordance with the operation condition. (For example, see the Japanese Patent Application Laid-Open No. 2001-248406.) This technology aims at mitigating the fluctuation of thermal expansion and contraction of the rotating blades 3A, 3B, 3C and 3D against the ring segments 8A, 8B, 8C and 8D during operation of a gas turbine (especially, during start-up), and constantly controls so as to secure a moderate amount of minute clearance between the tips of the rotating blades 3A, 3B, 3C and 3D, serving as the edges of the outer circumferences thereof, and the inner circumference surfaces of the ring segments 8A, 8B, 8C and 8D without contacting each other, thereby trying to improve performance of the gas turbine further.

In order to realize the above, sensors are installed in order to detect the clearance between the tip of the rotating blade 3A or 3B in the first or the second stage, which is especially subject to strong thermal impacts due to being exposed to high temperature combustion gas, and the inner circumference surface of the ring segment 8A or 8B, monitoring the aforementioned clearance. Based on the output of the sensor, the temperature, the pressure and the flow volume of the cooling fluid for blade rings/ring segments and the cooling fluid for rotors are adjusted so as to obtain a moderate amount of minute clearance between the tip of the rotating blade 3A or 3B and the inner circumference surface of the ring segment 8A or 8B in the first or the second stage, and as a result, the fluctuation of thermal expansion and contraction of the rotating blades 3A, 3B, 3C and 3D against the ring segments 8A, 8B, 8C ad 8D in each stage can be minimized.

Figure 9:
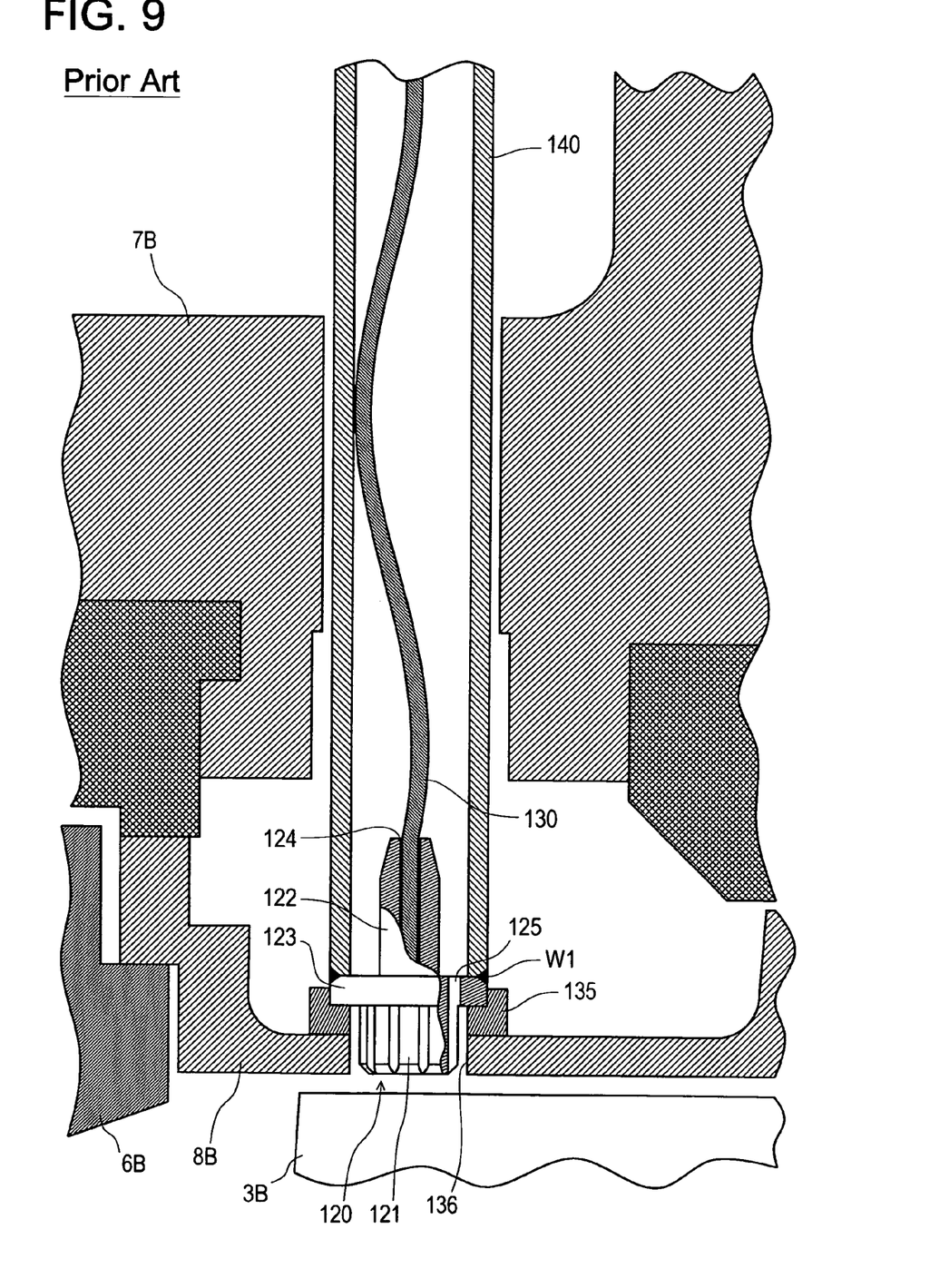
FIG. 9 is a longitudinal cross-sectional view showing necessary portions of the construction of installation of a sensor in a conventional gas turbine.

Here, FIG. 9 shows a conventional structure of installation of a sensor. In this figure, installation structure of a sensor is shown, which is employed for detecting a clearance between the tip of the rotating blade 3B and the inner circumference surface of the ring segment 8B in the second stage. As shown in FIG. 9, the sensor 120 is a FM modulation capacitance type sensor, mainly consisting of an anterior portion 121 which houses a detecting element having a detection zone forward, a posterior portion 122 which leads a cable 130 transmitting outputs from the detecting element backward, and a collar portion 123 which connects both anterior and posterior portions. The cable 130 whose copper wire serving as a signal line is clad with an insulating material is led out from the sensor 120 through a leading-out outlet 124 being formed in the posterior portion 122.

The sensor 120 as described hereinabove has the posterior portion 122 thereof inserted into the edge of a first guide pipe 140 made of metal such as stainless and the like; wherein, the edge of the first guide pipe 140 and the corner portions of the rear surface of the collar portion 123 are connected by welding (See the symbol "W1" in FIG. 9.), thereby having the sensor 120 unified with the first guide pipe 140. The first guide pipe 140 integrating the sensor 120 penetrates through the casing 1 and the blade ring 7B from the outside of the casing 1 (being located upward in FIG. 9). Then, by being pressed forcedly toward the ring segment 8B by a compression coil spring (not illustrated) which is installed to the edge portion of the first guide pipe 140 on the side of the casing 1, the front surface of the collar portion 123 is pressed toward the pedestal 135 being fixed onto the outer circumference surface of the ring segment 8B so as to be held. The anterior portion 121 is inserted and penetrates through the through-hole 136 going through the pedestal 135 and the ring segment 8B, and consequently, the front surface of the anterior portion 121 comes to the top of the inner circumference surface of the ring segment 8B. Additionally, the cable 130 from the leading-out outlet 124 in the posterior portion 122 is introduced to the outside of the casing 1 through the first guide pipe 140 after being led to the inside of the first guide pipe 140.

Inside the first guide pipe 140, is introduced a cooling fluid such as high pressure air and/or steam from the edge on the side of the casing 1. This cooling fluid is supplied by a pump for exclusive use which is separately installed to the outside of the casing 1. The cooling fluid being introduced into the inside of the first guide pipe 140 cools the cable 130 itself and at the same time, cools the anterior portion 121 itself by being introduced to the periphery of the anterior portion 121 by way of the through-hole 125 which penetrates through the collar portion 123 of the sensor 120.

In addition, by having the first guide pipe 140 pressed forcedly by a compression coil spring, the sensor 120 is pressed toward the ring segment 8B. This is for the purpose of tolerating thermal expansion and contraction when the casing 1, the blade ring 7B, the ring segment 8B and eventually the first guide pipe 140 itself thermally expand and/or contract in accordance with a change in temperature during operation of a gas turbine.

However, it was discovered that in the conventional construction of installation of a sensor as described above, the following issues would occur due to being subject to vibrations during operation of a gas turbine. First, the cable 130 spins significantly at a high speed inside the first guide pipe 140, thereby making the cable 130 come in contact with the pipe wall of the first guide pipe 140 repeatedly, which abrades away the insulation cladding material thereof and consequently generates noises to the output signals transmitted by the cable 130.

Secondly, because the leading-out outlet 124 in the posterior portion 122 of the sensor 120 from which the cable 130 is led out is angular, the cable 130 comes in contact with the angular corner portions of the leading-out outlet 124 repeatedly due to rapid spinning at a high speed of the cable 130 inside the first guide pipe 140, which causes disconnection of the cable 130 in the contact portions.

Thirdly, although structurally, the sensor 120 can be pulled out and inserted from the outside of the casing 1 together with the first guide pipe 140, the welded joint portion W1 of the first guide pipe 140 to the sensor 120 fractures due to fatigue, which virtually results in separation, thereby causing a situation in which it is impossible to pull out or insert the sensor 120 together with the first guide pipe 140. This situation forces to stop operation of the gas turbine for a long period and then disassemble the casing 1 and the blade ring 7B in order to replace the sensor 120. Therefore, especially the third issue is directly related to the shutdown period of a gas turbine, so that consequently it will become a big obstruction to put the above-mentioned technology of controlling the temperature, the pressure and the flow volume of the cooling fluid for blade rings/ring segments and the cooling fluid for rotors into practical use.

Figure 10:
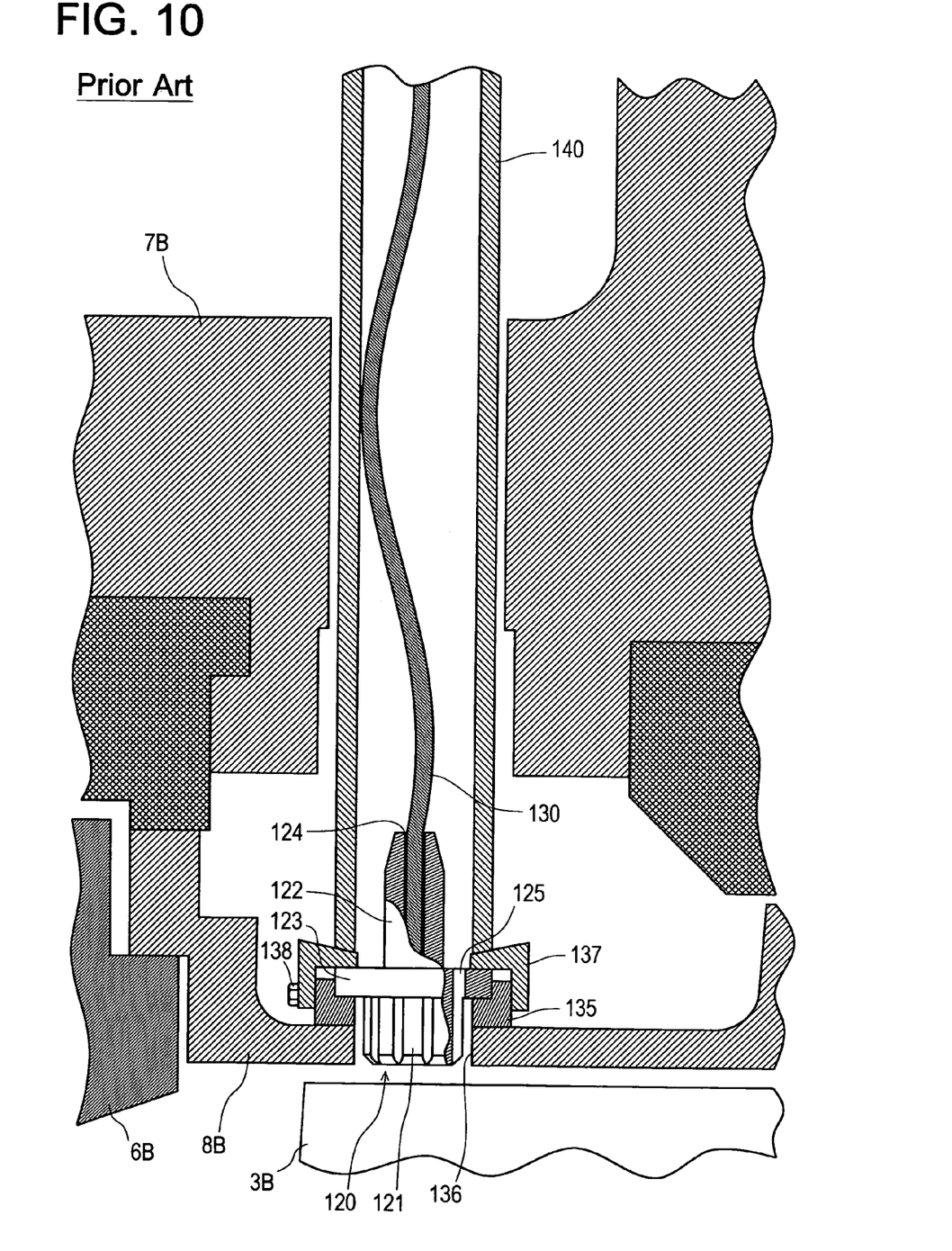
FIG. 10 is a longitudinal cross-sectional view showing other necessary portions of the construction of installation of a sensor in a conventional gas turbine.

In addition, as another example of construction of installation of a sensor as shown in FIG. 10, the first guide pipe 140 and the sensor 120 are completely separated as different members, wherein the sensor 120 is fixed to the ring segment 8B by sandwiching the front and rear surfaces of the collar portion 123 of the sensor 120 between a pedestal 135 and a holder 137 and joining the pedestal 135 and the holder 137 with a screw 138. In this case, the first guide pipe 140 being inserted from the outside of the casing 1 is retained by having the edge thereof on the side of the sensor 120 pressed onto the holder 137, receiving a pressing force of the compression coil spring. The cable 130 is guided along the inside of the first guide pipe 140 in the same manner as the construction of installation of a sensor shown in FIG. 9.

The construction of installation of a sensor as described hereinabove still generates the above-mentioned first and the second issues. In addition, because the sensor 120 is fixed to the ring segment 8B with a screw, it is impossible to replace the sensor 120 without disassembling the casing 1 and the blade ring 7B, so that the third issue still remains, too.

Figure 11:
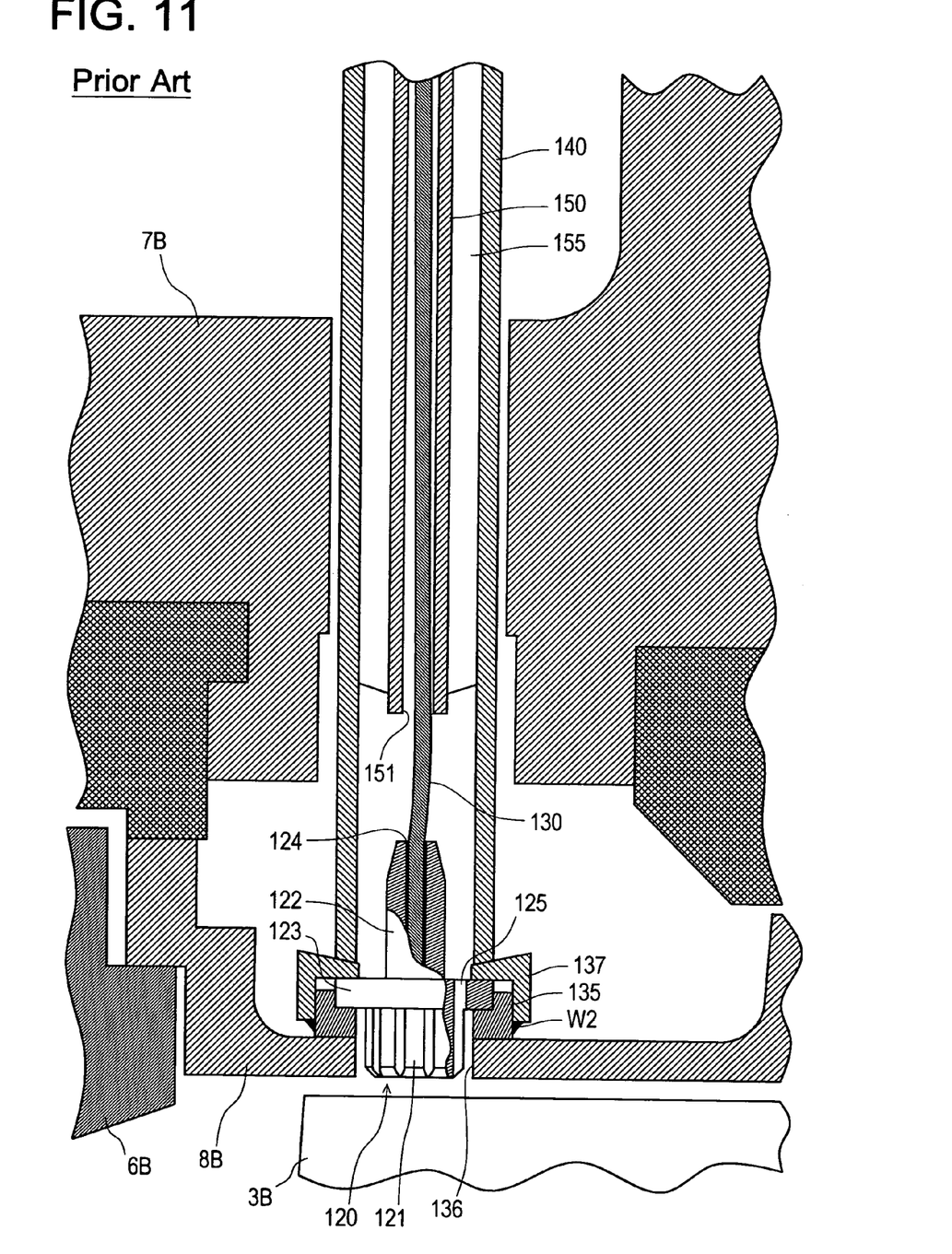
FIG. 11 is a longitudinal cross-sectional view showing necessary portions of another example of the construction of installation of a sensor in a conventional gas turbine.

Moreover, as another example of construction of installation of a sensor as shown in FIG. 11, the first guide pipe 140 and the sensor 120 are completely separated as different members in the same manner as the construction of installation of a sensor in FIG. 10; wherein the sensor 120 is fixed to the ring segment 8B by sandwiching the front and rear surfaces of the collar portion 123 of the sensor 120 between the pedestal 135 and the holder 137 and joining the pedestal 135 and the holder 137 by welding (See the symbol W2 in FIG. 11.) In this case, the first guide pipe 140 being inserted from the outside of the casing 1 is retained by having the edge thereof on the side of the sensor 120 pressed onto the holder 137, receiving a pressing force of the compression coil spring, too. However, in this case, inside the first guide pipe 140 is provided a second guide pipe 150 which extends along the inside thereof, and the cable 130 is guided along the inside of the second guide pipe 150. The second guide pipe 150 is supported to the pipe wall of the first guide pipe 140 by a plurality of support plates 155 which extend along the second guide pipe 150.

In the construction of installation of a sensor as described hereinabove, because the cable 130 is inside the second guide pipe 150, rapid spinning at a high speed of the cable 130 is restrained, so as to be able to prevent the cable 130 from coming in contact with the first guide pipe 140. However, because the opening edge 151 on the side of the sensor 120 of the second guide pipe 150 is angular, the cable 130 comes in contact with this angular corner portions repeatedly so as to wear away. Therefore, the above-mentioned first issue still remains. In addition, although a significant spinning at a high speed of the cable 130 can be restrained, the leading-out outlet 124 of the posterior portion 122 of the sensor 120 remains to be angular, the above-mentioned second issue will still occur. Additionally, because the sensor 120 is fixed to the ring segment 8B by welding, it is impossible to replace the sensor 120 without disassembling the casing 1 and the blade ring 7B, so that the third issue still remains, too.

SUMMARY OF THE INVENTION

It is an object of the present invention to provide a gas turbine which can make it possible to put a technology of controlling the temperature, the pressure and the flow volume of a cooling fluid for blade rings/ring segments and a cooling fluid for rotors into practical use.

In order to achieve the above-mentioned object, a gas turbine in accordance with a preferred embodiment of the present invention is provided with ring segment and blade ring that concentrically surround a rotating blade rotor which rotates inside a casing, being connected sequentially to the casing from the inside ones; and has sensor which detects clearance between the tip of the rotating blade of the rotating blade rotor and the inner circumference surface of the ring segment; wherein the sensor is integrated together with a first guide pipe by having the posterior portion thereof screwed together to the front edge of the first guide pipe, inside of which a cooling fluid is introduced into, and is pressed to the ring segment so as to retain in a manner that the anterior portion thereof including detecting element go through the ring segment, by having the first guide pipe go through the blade ring from the outside of the casing and be pressed forcedly toward the ring segment. Cable from the sensor is led to the outside of the casing by way of the first guide pipe after being led out to the inside of the first guide pipe through the leading-out outlet which is formed in the posterior portion thereof; and the sensor has through-holes formed for leading the cooling fluid being introduced into the inside of the first guide pipe to the periphery of the anterior portion.

As constructed as described hereinabove, because a sensor and the first guide pipe are joined mutually by being screwed together due to engagement of the thread so as to be integrated together, both members will not be separated although they are subject to vibrations during operation of a gas turbine. To put it plainly, it is ensured that the sensor and the first guide pipe, being integrally assembled, can be pulled out and inserted from the outside of the casing. As a result, in order to replace a sensor, it is unnecessary to disassemble the casing and blade rings, and additionally, the shutdown period of a gas turbine can be significantly shortened. As a matter of course, the cables themselves can be cooled by the cooling fluid being introduced into the inside of the first guide pipe, and the anterior portion of a sensor is also cooled by the cooling fluid flowing through the through-hole being formed in the successive sensor. Additionally, because the sensor is pressed to the ring segment by having the first guide pipe pressed forcedly by a compression coil spring, thermal expansion and contraction difference can be tolerated sufficiently when the casing, blade rings, ring segments and eventually the first guide pipe itself are thermally expanded and/or contracted in accordance with a change in temperature during operation of the gas turbine.

Here, in a viewpoint of practical use, the sensor is preferable to be an FM modulation capacitance type sensor.

In addition, in a viewpoint of preventing inadvertent disconnection of a cable rapidly spinning at a high speed due to vibrations during operation of a gas turbine, it is preferable that the leading-out outlet is formed to be flared.

Moreover, in order to restrain a cable from spinning significantly at a high-speed due to vibrations during operation of a gas turbine and at the same time in order to prevent inadvertent wear of the cable, it is preferable that a second guide pipe guiding the cable along the inside thereof is provided to the inside of the first guide pipe, wherein the edge of the opening of the second guide pipe on the sensor side is formed so as to be flared.

Additionally, it is preferable that a plurality of stages are provided with the rotating blade rotor, the ring segment and the blade ring, wherein the sensor is installed for the purpose of detecting the clearance between the tip of the rotating blade of the rotating blade rotor in the second stage and the inner circumference surface of the ring segment in the second stage.

In such a case as described hereinabove, from a viewpoint of simplifying the source of supply of a cooling fluid which is to be introduced to the first guide pipe, it is preferable that the cooling fluid for blade rings/ring segments is introduced into a space being formed by the casing and the ring segment in the second stage for the purpose of cooling the blade ring and the ring segment in the second stage; wherein, a part of the first guide pipe comes to the top in the space and a through-hole is formed into the part of the pipe wall.

In the gas turbine in accordance with the present invention, because the sensors detecting the clearances between the tips of the rotating blades and the inner circumference surfaces of the ring segments can surely be pulled out and inserted from the outside of the casing, being integrated together with the first guide pipe penetrating through the blade rings from the outside of the casing, the shutdown period of the gas turbine for replacement of the sensors can be significantly shortened. As a result, the technology of controlling the temperature, the pressure and the flow volume of the cooling fluid for blade rings/ring segments to cool the stationary vanes and rotating blades and the cooling fluid for rotors can sufficiently be put into practical use.

DESCRIPTION OF THE PREFERRED EMBODIMENTS

Figure 1:
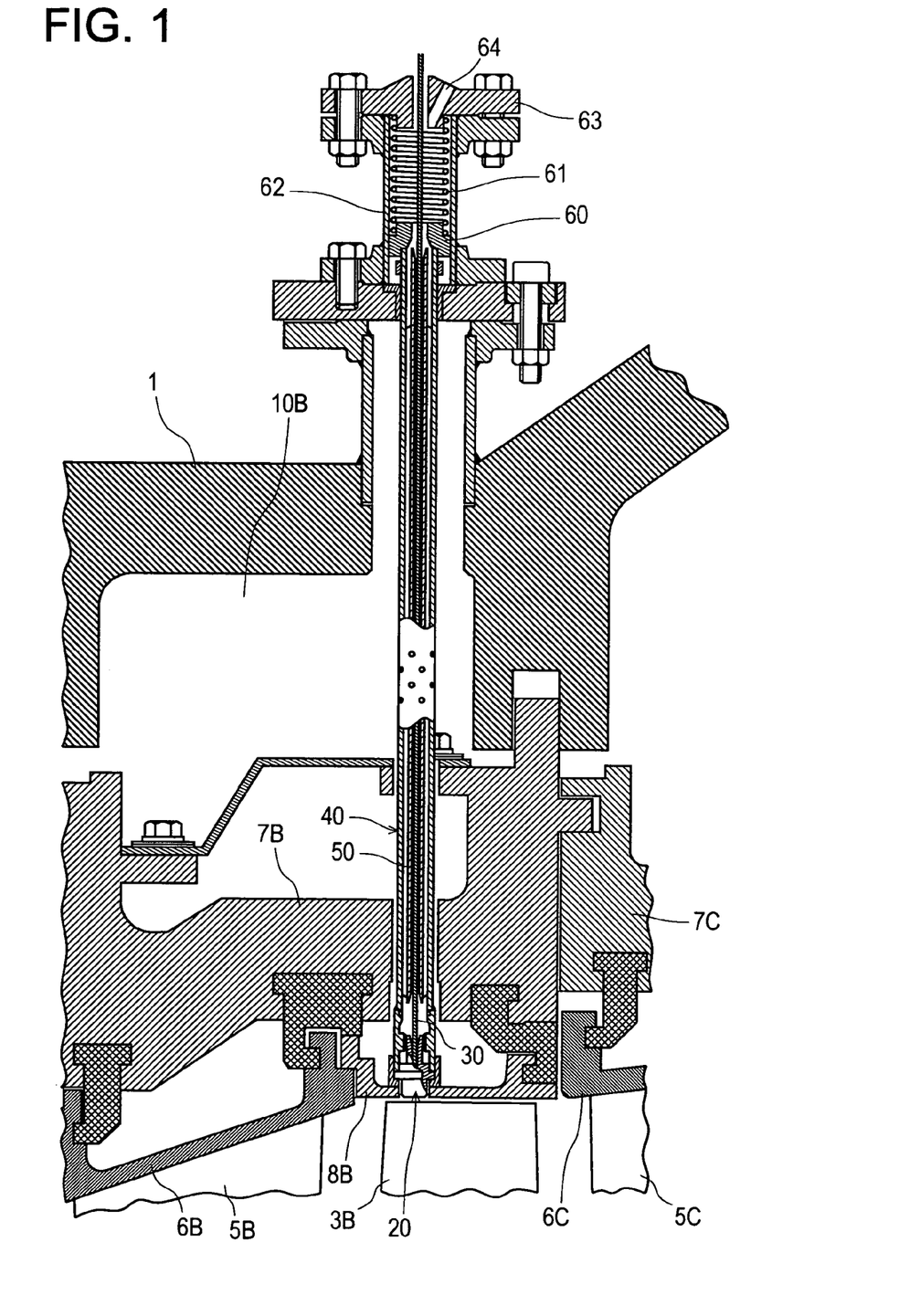
FIG. 1 is a longitudinal cross-sectional view showing a construction of installation of a sensor in a gas turbine in accordance with the present invention.
Figure 2:
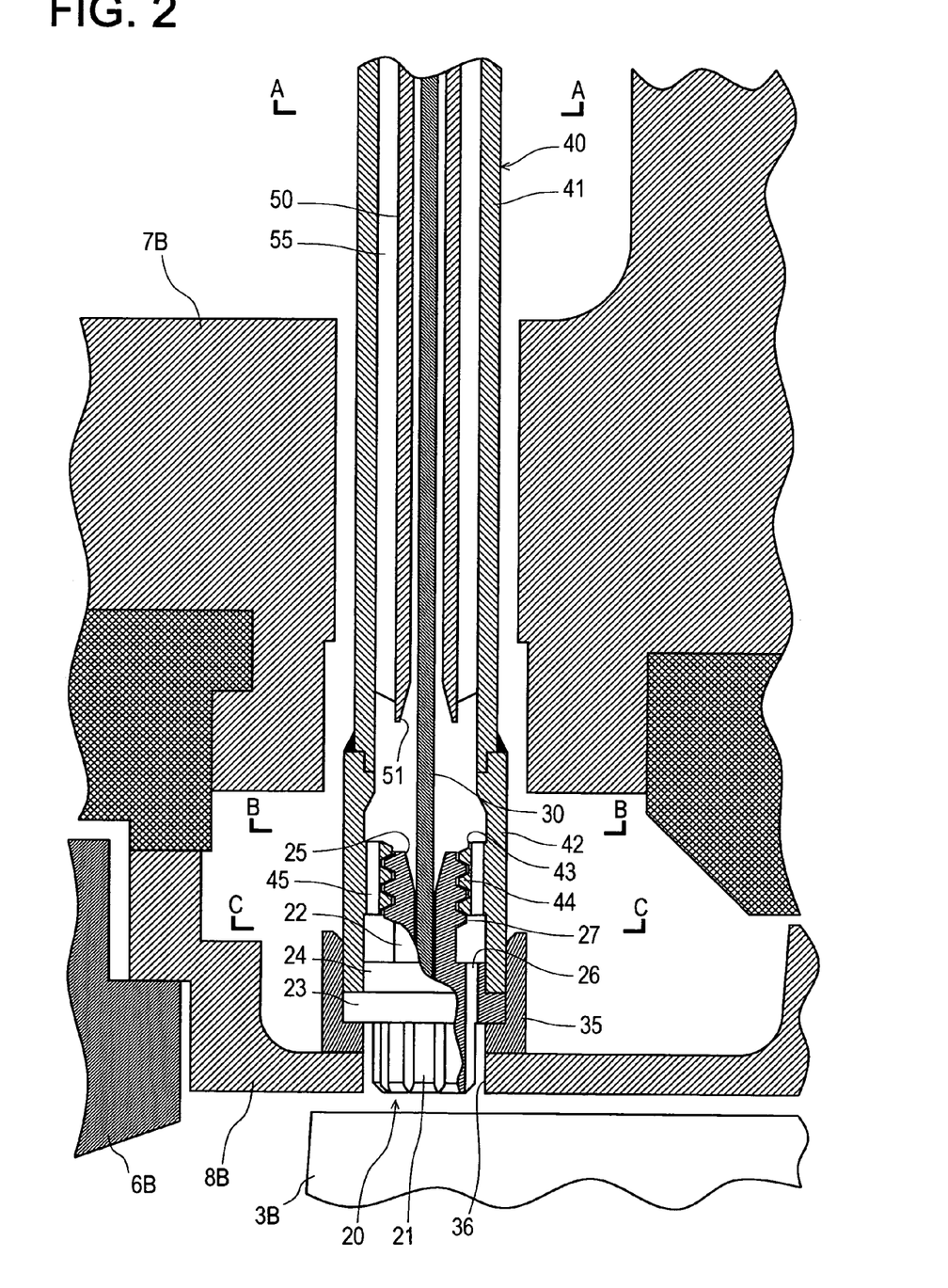
FIG. 2 is a longitudinal cross-sectional view showing necessary portions of the construction of installation of a sensor in a gas turbine in FIG. 1.
Figure 3:
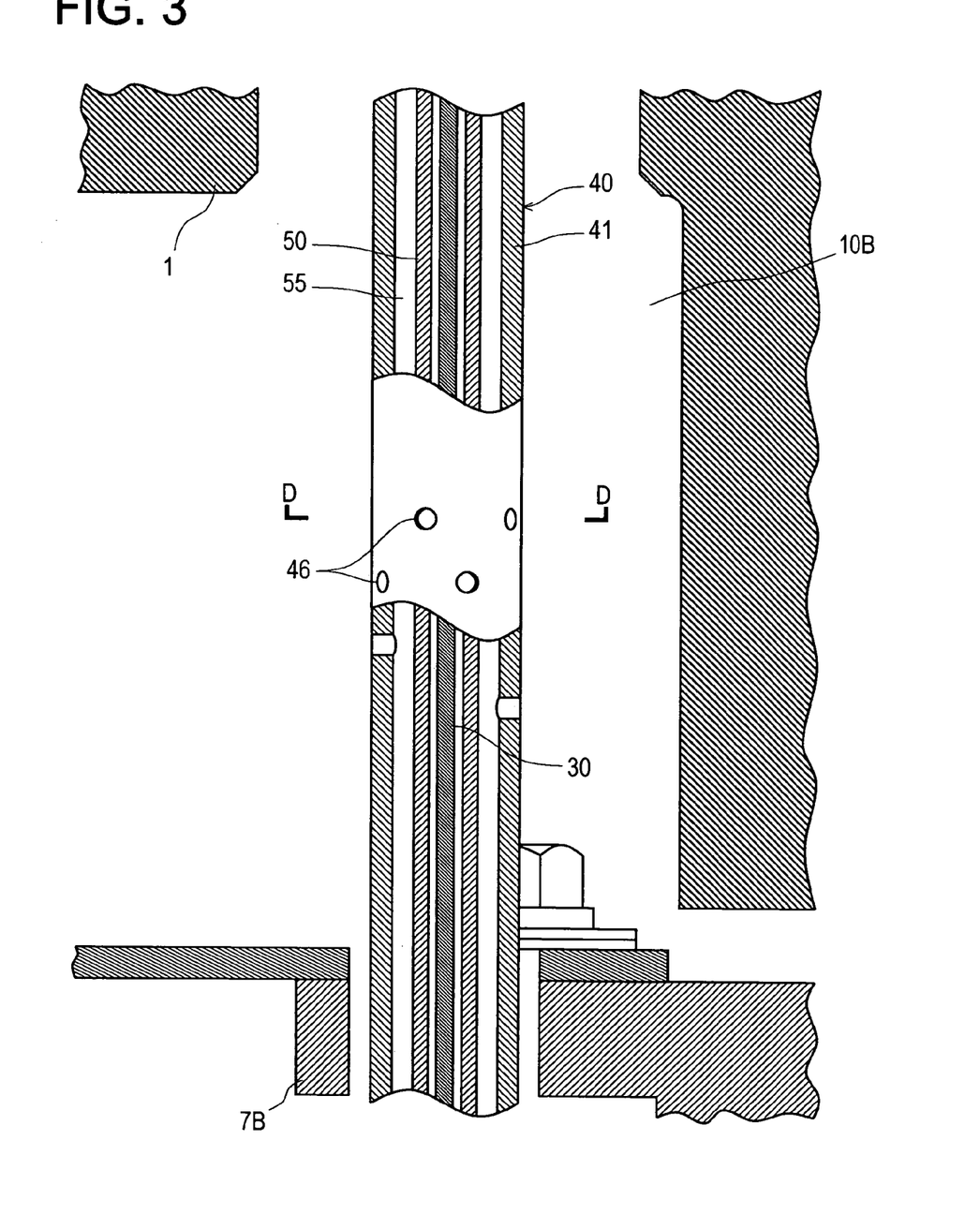
FIG. 3 is a longitudinal cross-sectional view showing other necessary portions of the construction of installation of a sensor in a gas turbine in FIG. 1.
Figure 4:
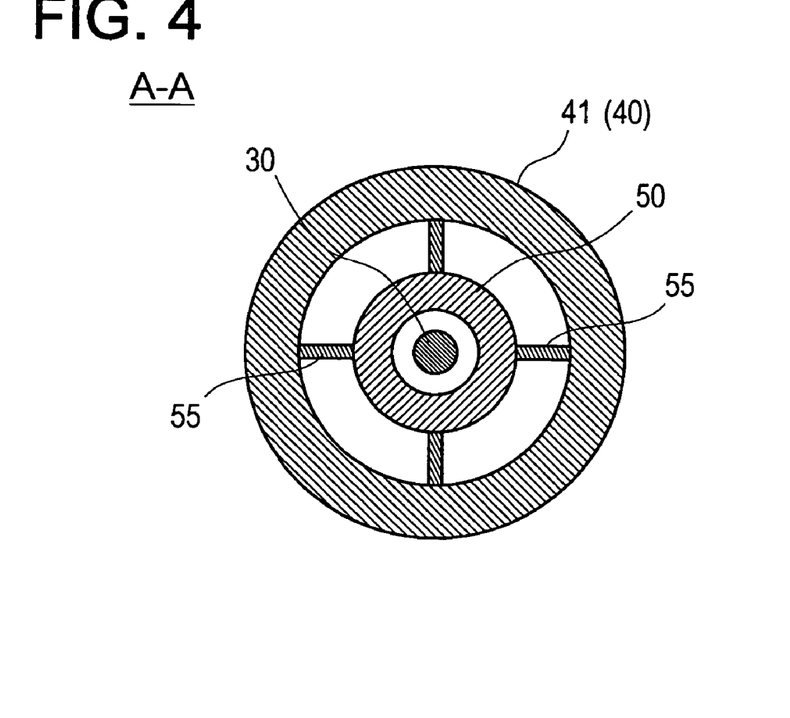
FIG. 4 is a cross-sectional view cut at A—A of FIG. 2.
Figure 5:
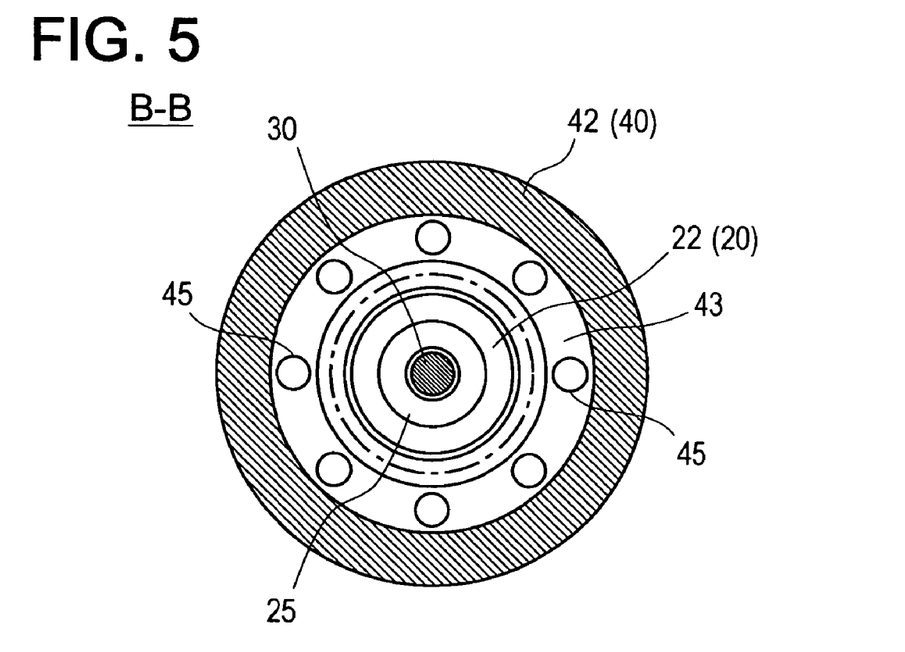
FIG. 5 is a cross-sectional view cut at B—B of FIG. 2.
Figure 6:
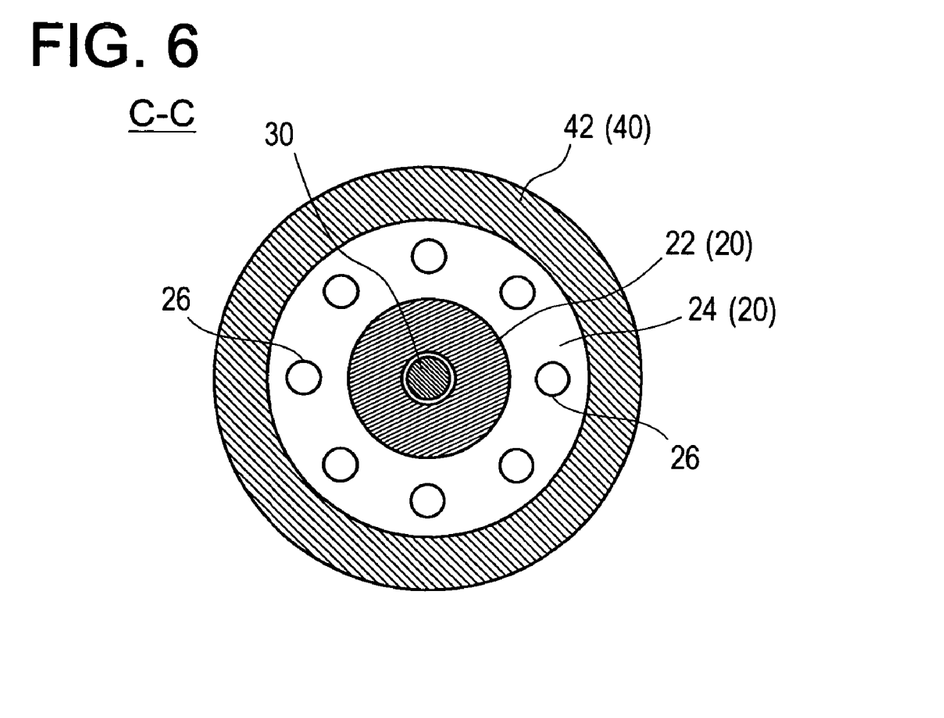
FIG. 6 is a cross-sectional view cut at C—C of FIG. 2.
Figure 7:
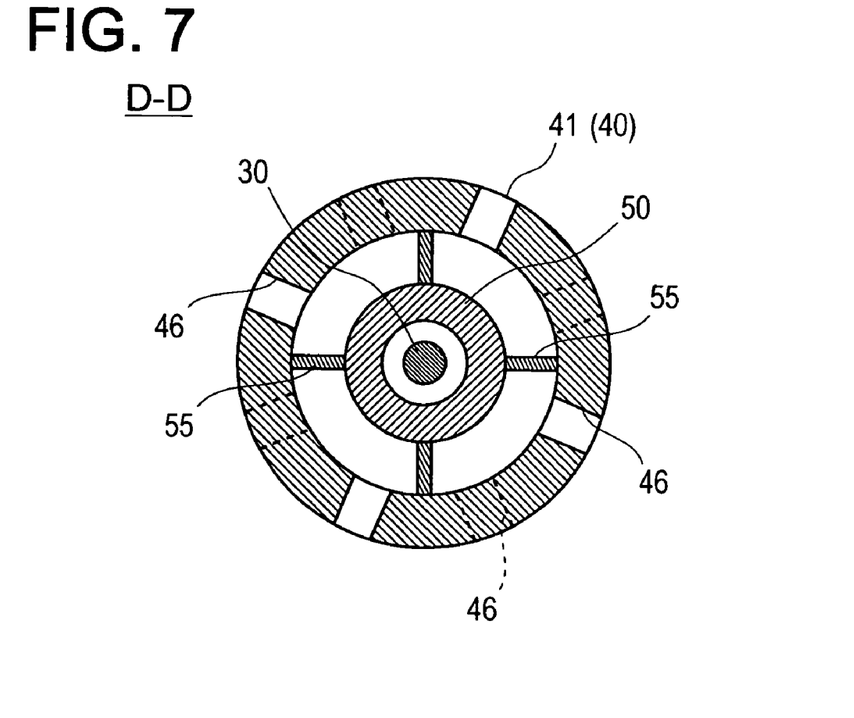
FIG. 7 is a cross-sectional view cut at D—D of FIG. 3.

Referring now to the drawings, an embodiment of the present invention will be described hereinafter. FIG. 1 is a longitudinal cross-sectional view showing the entire construction of installation of a sensor in a gas turbine in accordance with an embodiment of the present invention; FIG. 2 is a longitudinal cross-sectional view being enlarged and showing the vicinity of a sensor that includes necessary portions of the construction of installation of the sensor; and FIG. 3 is a longitudinal cross-sectional view being enlarged and showing other necessary portions of the construction of installation of the sensor, from the casing to the vicinity of a blade ring. FIG. 4 is a cross-sectional view cut at A—A of FIG. 2; FIG. 5 is a cross-sectional view cut at B—B of FIG. 2; FIG. 6 is a cross-sectional view cut at C—C of FIG. 2; and FIG. 7 is a cross-sectional view cut at D—D of FIG. 3.

As shown in FIG. 1 and FIG. 2, a gas turbine in accordance with this embodiment of the present invention adopts the clearance between the tip serving as the outer circumference edge of the rotating blade 3B and the inner circumference surface of the ring segment 8B in the second stage as an input element to control the temperature, the pressure and the flow volume of the cooling fluid for blade rings/ring segments to cool the stationary vanes 5A, 5B, 5C and 5D and the cooling fluid for rotors to cool the rotating blades 3A, 3B, 3C and 3D, wherein a sensor 20 is installed to detect the clearance. Four (4) sensors 20 are installed so as to detect the clearances in four directions, namely at the top and the bottom and on the left and the right of the circumference of the main shaft. Then, based on the outputs from each of the sensors 20, the temperature, the pressure and the flow volume of the cooling fluid for blade rings/ring segments and the cooling fluid for rotors are adjusted so as to minimize the clearance between the tip of the rotating blade 3B and the inner circumference surface of the ring segment 8B in the second stage to obtain the proper minute clearance, consequently restraining a fluctuation in thermal expansion and contraction of the rotating blades 3A, 3B, 3C and 3D against the ring segments 8A, 8B, 8C and 8D in each stage to minimum.

Next, the construction of installation of a sensor in accordance with the embodiment of the present invention will be described. A sensor 20 is an FM modulation capacitance type sensor, mainly consisting of an anterior portion 21 housing a detecting element that includes a detection zone forward, a posterior portion 22 leading a cable 30 backward that transmits the outputs from the detecting element, and a first and a second collar portions 23 an 24 that connect the anterior and the posterior portions 21 and 22. These members are placed axially so as to be integrated together. The first collar portion 23 has a larger diameter than the second collar portion 24 and is placed on the side of the anterior portion 21. The cable 30 has a copper wire serving as a signal line clad with an insulating material and is led out from the sensor 20 through the leading-out outlet 25 being formed in the posterior portion 22. The leading-out outlet 25 in the posterior portion 22 is formed so as to be flared in a manner that the inside diameter gradually spreads out.

The first and the second collar portions 23 and 24 constructing a sensor 20 have a plurality of through-holes 26, for example, eight holes (See FIG. 6.) formed, penetrating through from the posterior edge surface of the second collar portion 24 to the anterior edge surface of the first collar portion 23 (actually, furthermore, along a groove being formed on the outer circumference surface of the anterior portion 21). Each of these through-holes 26 is arranged equiangularly at regular intervals against the center of axle of the sensor 20. Especially, in accordance with the present embodiment, the outer circumference surface of the posterior portion 22 constructing the sensor 20 has spiral male threads 27 formed so as to be in meshing engagement with female threads 44 being formed in a secondary pipe 42 of the first guide pipe 40 which is to be described hereinafter.

The sensor 20 as described hereinabove is integrated together with the first guide pipe 40, and concrete construction of the first guide pipe 40 will be described hereafter.

The first guide pipe 40 is a metal pipe made of stainless and the like, consisting of a main pipe 41 being long enough to penetrate through the casing 1 and the blade ring 7B from the outside of the casing 1 and a secondary pipe 42 being engaged into the front edge of the main pipe 41 and fixed by welding. Inside of the main pipe 41 constructing the first guide pipe 40 is concentrically provided with the second guide pipe 50 made of metal such as stainless and the like which extends along the main pipe 41; wherein the second guide pipe 50 is supported to the pipe wall of the main pipe 41, which is namely the first guide pipe 40, by a plurality of pieces of support plates 55, for example, by four (4) pieces (See FIG. 4 or FIG. 7.) that extend along the second guide pipe 50. The opening 51 at the edge portion of the second guide pipe 50 on the side of the secondary pipe 42 is formed so as to be flared in a manner that the inside diameter gradually spreads out. Incidentally, an opening at the edge portion of the second guide pipe 50 being on the opposite side is also formed so as to be flared in the same manner.

On the other hand, the inner circumference surface of the secondary pipe 42 constructing the first guide pipe 40 has an annular portion 43 being concentric to the secondary pipe 42 protrude; wherein the inner circumference surface of the annular portion 43 has female threads 44 formed so as to be in meshing engagement with male threads 27 being formed in the posterior portion 22 of the sensor 20. Additionally, the annular portion 43 has a plurality of through-holes 45, for example eight (8) through-holes, (See FIG. 5) formed, penetrating through from the posterior edge surface to the anterior edge surface. Each of these through-holes 45 is arranged equiangularly at regular intervals against the center of axle of the secondary pipe 42.

The sensor 20 has the posterior portion 22 thereof inserted from the front edge of the secondary 42 being the front edge of the first guide pipe 40 as described hereinabove to be screwed in. By this, the male threads 27 of the posterior portion 22 of the sensor 20 are in meshing engagement with the female threads 44 of the annular portion 43 of the secondary pipe 42 so as to be screwed together and connected in a manner that the second collar portion 24 of the sensor 20 is fit in the inside of the secondary pipe 42. The sensor 20 and the first guide pipe 40 are integrated together in this way. Additionally, the front edge of the secondary pipe 42 and the corner portions on the rear surface of the first collar portion 23 of the sensor 20 are connected by spot welding supplementarily.

The first guide pipe 40 being integrated together with the sensor 20 penetrates through the casing 1 and the blade ring 7B from the outside of the casing 1. Then, the edge portion of the first guide pipe 40 on the side of the casing 1 is pressed forcedly toward the ring segment 8B by a compression coil spring 61 being provided by way of a spring supporting member 60, thereby having the first collar portion 23 fit into the pedestal 35 which is fixed onto the outer circumference surface of the ring segment 8B, and at the same time, having the front surface of the first collar portion 23 pressed onto the pedestal 35 so as to retain. The anterior portion 21 goes through the through-hole 36 which penetrates through the pedestal 35 and the ring segment 8B in the condition as described hereinabove, and the front surface of the anterior portion 21 comes to the top of the inner circumference surface of the ring segment 8B. In addition, the cable 30 from the leading-out outlet 25 of the posterior portion 22 is guided along the second guide pipe 50 in the first guide pipe 40, which is namely the main pipe 41, after being led out to the inside of the first guide pipe 40, which is namely the secondary pipe 42, and is led to the outside of the casing 1 through the second guide pipe 50.

A cooling fluid such as a high pressure air and/or steam is introduced into the inside of the first guide pipe 40 from the front edge thereof on the side of the casing 1. Specifically, the front edge portion of the first guide pipe 40 outside of the casing 1, including the spring supporting member 60 and the compression coil spring 61, is housed in a spring casing 62, and the cooling fluid is introduced through the fluid-leading inlet 64 which is formed in the cover member 63 in a state of flange sealing the spring casing 62. The cooling fluid is supplied by a pump for exclusive use which is separately installed outside of the casing 1. Additionally, the cable 30 being led out from the second guide pipe 50 penetrates through the spring supporting member 60 and the compression coil spring 61 in the spring casing 62 and further goes through the cover member 63 so as to be led to the outside.

Then, the cooling fluid being introduced to the inside of the first guide pipe 40, which is namely the main pipe 41, cools the cable 30 itself inside the second guide pipe 50 and is led to the periphery of the anterior portion 21 through the through-hole 45 in the annular portion 43 of the secondary pipe 42 and further through the through-hole 26 penetrating through the first and the second collar portions 23 and 24 of the sensor 20, so as to cool the anterior portion 21 itself In addition, when the cooling fluid flows in the clearance between the first guide pipe 40 and the second guide pipe 50, the support plates 55 will not be obstruction because the support plates 55 extend along the first guide pipe 40 and the second guide pipe 50.

Here, in the embodiment in accordance with the present invention, a part of the main pipe 41 serving as the first guide pipe 40 comes to the top of the space 10B being formed by the casing 1 and the blade ring 7B in the second stage; wherein, a cooling fluid for blade rings/ring segments for cooling the outside shroud 6B and the stationary vane 5B in the second stage including the blade ring 7B in the second stage and further the ring segment 8B in the second stage is introduced into the inside of the space 10B. Because the cooling fluid for blade rings/ring segments for cooling the stationary vane 5B in the second stage is relatively low temperature, in order to use it effectively, a plurality of through-holes 46 are formed into the pipe wall of the main pipe 41 coming to the top of the space 10B as shown in FIG. 1, FIG. 3 and FIG. 7; and the cooling fluid for blade rings/ring segments are introduced into the inside of the main pipe 41, which is namely the first guide pipe 40, through the through-hole 46. By this, although the cooling fluid is not supplied by such a pump for exclusive use as described hereinabove, the cooling fluid for blade rings/ring segments can be used for both, thereby eliminating the pump for exclusive use which serves as a supply source of the cooling fluid.

In accordance with such construction of installation of sensors as described hereinabove, because the sensor 20 and the first guide pipe 40 are joined and integrated together by being screwed together by mutual engagement of threads, both of the sensor 20 and the first guide pipe 40 will not be separated even though vibrations are applied thereto during operation of a gas turbine. Furthermore, because the sensor 20 and the first guide pipe 40 are connected by spot welding, in addition to the joint by being screwed together, both can surely be retained, so as to achieve superior resistance to vibration. To put it plainly, the sensor 20 and the first guide pipe 40 can surely be pulled out and inserted from the outside of the casing 1 in condition of being integrated together as an assembly. Therefore, in replacing the sensor 20, it is completely unnecessary to disassemble the casing 1 and blade ring 7B, which significantly makes the shutdown period of a gas turbine shorter and dramatically enhances maintainability. Consequently, an obstruction to adopt a technology for controlling the temperature, the pressure and the flow volume of the cooling fluid for blade rings/ring segments and the cooling fluid for rotors is eliminated and practical application of the control technology can be fully possible.

Additionally, by pressing the first guide pipe 40 with a compression coil spring 61, the sensor 20 is pressed to the ring segment 8B. Therefore, even when the casing 1, the blade ring 7B, a ring segment 8B, or eventually the first guide pipe 40 itself is thermally expanded or contracted in accordance with a change in temperature during operation of a gas turbine, the thermal expansion and contraction differentials can be sufficiently permissible.

Moreover, because the cable 30 is inside the second guide pipe 50, significantly rapid spinning at a high speed of the cable 30 being caused by vibrations during operation of a gas turbine can be restrained. In addition, because the opening 51 of the second guide pipe 50 on the side of the sensor 20 is flared, the cable 30 will not get contact with this portion repeatedly, so that, needless to say, wear will never occur. In consequence, output signals from the cable 30 are stabilized.

Furthermore, because the leading-out outlet 24 at the posterior portion 22 of the sensor 20 is flared, the cable 30 will not be subject to repeated contact at this portion, and as a result, the cable 30 can be prevented from being disconnected.

While the present invention has been described with what is presently considered to be the most practical and preferred embodiment, it is to be understood that the invention is not limited to the disclosed embodiment as mentioned above, but on the contrary, is intended to cover various modifications and within the spirit and scope of the appended claims. For example, the object of detection of the sensor 20 may be a clearance between the tip of the rotating blade 3A and the inner circumference surface of the ring segment 8A in the first stage. Needless to say, it is applicable to detect the clearances between the tips of the rotating blades 3C and 3D and the inner circumference surfaces of the ring segments 8C and 8D in the subsequent rear stages.

Additionally, it is possible to have the compressed air from a compressor of a gas turbine cover the supply of the cooling fluid to be introduced into the inside of the first guide pipe 40. In this case, a pump for exclusive use, serving as a supply source of the cooling fluid, is also unnecessary, thereby enhancing the reliability.

As described hereinabove, obviously, it is possible to provide the present invention with various modifications and deformations. Therefore, it is understood that the present invention will be executed within the scope of the appended claims without sticking to concrete description.

What is claimed is:

1. A gas turbine comprising ring a segment and a blade ring that concentrically surround a rotating blade rotor which rotates inside a casing and are coupled to a casing sequentially from inside and having a sensor provided thereto that detects clearance between tip of rotating blade of the rotating blade rotor and inner circumference surface of the ring segment:

wherein, the sensor is integrated together with a first guide pipe by having an edge of the first guide pipe, inside of which has a cooling fluid introduced into, screwed together with a posterior portion thereof; and the anterior portion thereof including a detecting element is pressed to the ring segment so as to retain, penetrating through the ring segment, by having the first guide pipe penetrate through the blade ring from outside of the casing and pressed forcedly to the ring segment;

wherein, a cable from the sensor is led to outside of the casing through the first guide pipe after being introduced into inside of the first guide pipe through a leading-out outlet being formed in the posterior portion; and wherein, the sensor has a through-hole formed therein which leads the cooling fluid being introduced into inside of the first guide pipe to periphery of the anterior portion.

2. A gas turbine as described in claim 1,
   wherein, the sensor and the first guide pipe are extracted and inserted from outside of the casing, by being pulled in and out, in condition of being integrated together as an assembly.

3. A gas turbine as described in claim 1,
   wherein, the sensor and the first guide pipe are welded to each other to retain.

4. A gas turbine as described in claim 1,
   wherein, the first guide pipe is pressed forcedly by a compression coil spring.

5. A gas turbine as described in claim 1,
   wherein, the sensor is an FM modulation capacitance type sensor.

6. A gas turbine as described in claim 1,
   wherein, the leading-out outlet is formed to be flared.

7. A gas turbine as described in claim 1,
   wherein, inside of the first guide pipe is provided with a second guide pipe guiding the cable along inside, and an edge of an opening of the second guide pipe on the sensor side is formed to be flared.

8. A gas turbine as described in claim 1,
   wherein, the rotating blade rotor, the ring segment and the blade ring are provided to a plurality of stages; and wherein, the sensor is installed to detect clearance between tip of rotating blade of the rotating blade rotor in a second stage and inner circumference surface of the ring segment in a second stage.

9. A gas turbine as described in claim 8,
   wherein, into a space being formed between the casing and the blade ring in a second stage is introduced a cooling fluid for blade rings/ring segments which is to cool the blade ring and the ring segment in a second stage; and wherein, a part of the first guide pipe comes to top of the space and a through-hole is formed in a part of pipe wall thereof.

10. A gas turbine as described in claim 1,
    wherein, inside the first guide pipe is introduced a compressed air from a compressor of the gas turbine, serving as the cooling fluid.

* * * * *